United States Patent
Hagita

(10) Patent No.: US 9,263,083 B2
(45) Date of Patent: Feb. 16, 2016

(54) RECORDING AND REPRODUCING APPARATUS

(71) Applicant: Panasonic Intellectual Property Management Co., Ltd., Osaka (JP)

(72) Inventor: Hirokuni Hagita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/432,642

(22) PCT Filed: Aug. 30, 2013

(86) PCT No.: PCT/JP2013/005142
§ 371 (c)(1),
(2) Date: Mar. 31, 2015

(87) PCT Pub. No.: WO2014/054216
PCT Pub. Date: Apr. 10, 2014

(65) Prior Publication Data
US 2015/0255108 A1      Sep. 10, 2015

(30) Foreign Application Priority Data
Oct. 1, 2012   (JP) .................................. 2012-219123

(51) Int. Cl.
*G11B 21/08*      (2006.01)
*G11B 17/22*      (2006.01)

(52) U.S. Cl.
CPC .............. *G11B 17/228* (2013.01); *G11B 17/22* (2013.01)

(58) Field of Classification Search
None
See application file for complete search history.

(56) References Cited

U.S. PATENT DOCUMENTS 4,899,326 A * 2/1990 Takeya et al. .............. 369/30.83
5,884,298 A * 3/1999 Smith et al.
(Continued)

FOREIGN PATENT DOCUMENTS

JP      10-334572      12/1998
JP      2005-302135    10/2005
(Continued)

OTHER PUBLICATIONS

Computer partial translation of JP, 2008-299883, publication on Dec. 11, 2008.*
(Continued)

*Primary Examiner* — Tan X Dinh
(74) *Attorney, Agent, or Firm* — Wenderoth, Lind & Ponack, L.L.P.

(57) ABSTRACT

A recording and reproducing apparatus of this disclosure includes, reader writer 5 which acquires magazine identifying information and capacity information from RF tag 13 provided with magazine, information storage unit 6 which stores contents information recorded on optical discs 12 and the magazine identifying information and the capacity information acquired by the information acquiring unit 5, information comparing unit 7 which compares the capacity information acquired by reader writer 5 and the capacity information stored in information storage unit 6. When two pieces of the capacity information compared by information comparing unit 7 match, the contents information stored in information storage unit 6 is displayed on display unit 9. When two pieces of the capacity information compared by information comparing unit 7 are different, the contents information is read out from optical discs 12 by controlling drive 4, and the read-out contents information is displayed on display unit 9.

8 Claims, 10 Drawing Sheets

(56) References Cited

U.S. PATENT DOCUMENTS

| | | | |
|---|---|---|---|
| 6,130,744 A | 10/2000 | Abe et al. | |
| 6,597,862 B1 * | 7/2003 | Saeki et al. | 386/295 |
| 2005/0007898 A1 * | 1/2005 | Maeda | 369/30.38 |
| 2007/0053250 A1 * | 3/2007 | Wu | 369/30.86 |
| 2008/0178206 A1 * | 7/2008 | Iida | 720/648 |
| 2010/0254241 A1 * | 10/2010 | Aoki | 369/84 |
| 2014/0075116 A1 * | 3/2014 | Takahashi et al. | 711/114 |
| 2014/0198629 A1 * | 7/2014 | Takagi et al. | 369/100 |

FOREIGN PATENT DOCUMENTS

| | | |
|---|---|---|
| JP | 2007-329705 | 12/2007 |
| JP | 2008-299883 | 12/2008 |
| JP | 2012-160245 | 8/2012 |

OTHER PUBLICATIONS

International Search Report issued Dec. 3, 2013 in International (PCT) Application No. PCT/JP2013/005142 with English translation.

International Preliminary Report on Patentability and Written Opinion of the International Searching Authority issued Apr. 16, 2015 in International (PCT) Application No. PCT/JP2013/005142.

* cited by examiner

| MAGAZINE IDENTIFYING INFORMATION | EMPTY CAPACITY | TIME |
|---|---|---|
| XYZW | 50M | 10 HOURS 15 MINUTES 53 SECONDS, SEPTEMBER 25, 2012 |

Fig.4

| MAGAZINE IDENTIFYING INFORMATION | EMPTY CAPACITY | TIME | CONTENTS INFORMATION |
|---|---|---|---|
| ABCD | 1.2G | 09 HOURS 45 MINUTES 13 SECONDS, SEPTEMBER 24, 2012 | |
| .... | .... | .... | .... |
| XYZW | 100M | 15 HOURS 31 MINUTES 05 SECONDS, SEPTEMBER 1, 2012 | PROGRAM TITLE A<br>PROGRAM TITLE B |

Fig.5

| MAGAZINE IDENTIFYING INFORMATION | EMPTY CAPACITY | TIME | CONTENTS INFORMATION |
|---|---|---|---|
| ABCD | 1.2G | 09 HOURS 45 MINUTES 13 SECONDS, SEPTEMBER 24, 2012 | |
| .... | .... | .... | .... |
| XYZW | 50M | 10 HOURS 15 MINUTES 53 SECONDS, SEPTEMBER 25, 2012 | PROGRAM TITLE A<br>PROGRAM TITLE B<br>PROGRAM TITLE C |

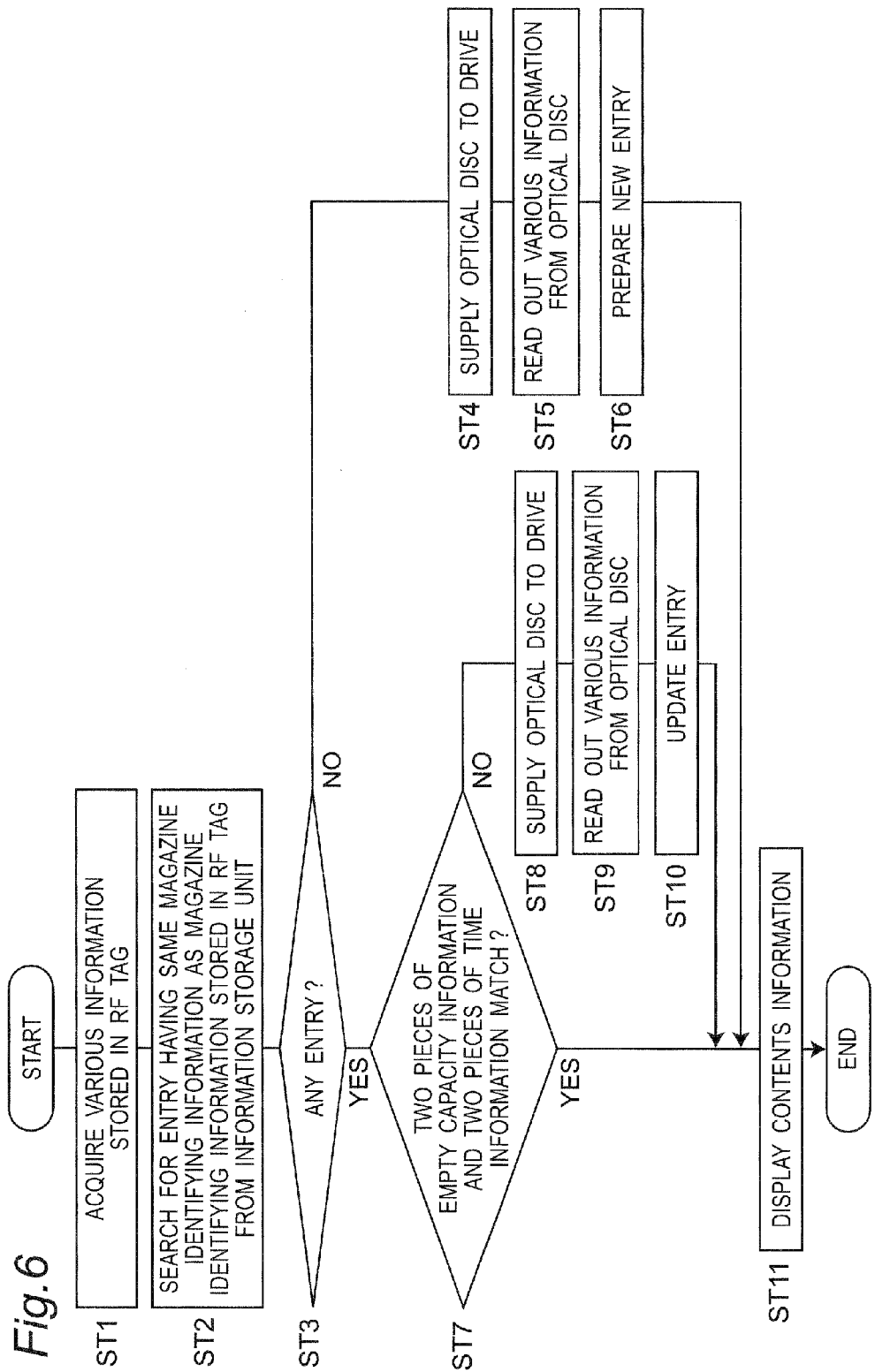

RECORDING AND REPRODUCING APPARATUS

TECHNICAL FIELD

The present disclosure relates to a recording and reproducing apparatus capable of referring to information (hereinafter, referred to as contents information) on contents recorded on an optical disc such as CD, DVD, and BD.

BACKGROUND ART

Conventionally, as to this type of recording and reproducing apparatus, the apparatus is known that is disclosed, for example, in Patent Document 1 (Japanese Unexamined Patent Publication No. 2005-302135).

Patent Document 1 discloses an optical disc having an IC tag to store medium information including a medium identifier uniquely assigned to the optical disc. Patent Document 1 discloses a recording and reproducing apparatus having a medium information acquiring unit which acquires the medium identifier from the medium information stored in the IC tag, a contents list storage unit which stores the contents information stored in the optical disc, correlated to the medium identifier, a searching unit which searches for the contents information corresponding to the medium identifier acquired by the medium information acquiring unit from the contents list storage unit, and a display controller which causes a display unit to display results of searching by the searching unit.

The recording and reproducing apparatus of Patent Document 1 makes it possible to refer to the contents information stored in an optical disc by causing the medium information acquiring unit to acquire the medium identifier stored in the IC tag, without inserting the optical disc into a drive (device which performs recording or reproduction to or from optical disc).
Patent Document
Patent Document 1: Japanese Unexamined Patent Publication No. 2005-302135

SUMMARY OF THE INVENTION

Problem to be Solved by the Invention

In the recording and reproducing apparatus of Patent Document 1, however, since the display unit displays the contents information stored in the contents list storage unit, the contents information displayed by the display unit can be incorrect. For example, when an optical disc is used in other recording and reproducing apparatus and the contents information of the optical disc is updated, since the updated contents information is not stored in the contents list storage unit, correct contents information (updated contents information) cannot be referred to.

On the other hand, this applicant is studying a recording and reproducing apparatus which has plural magazines to contain optical discs, takes out an optical disc from any one of the plural magazines to be transported to an arbitrary drive, and performs recording or reproduction to or from the optical disc. This recording and reproducing apparatus makes it possible to have a higher data capacity by increasing the number of magazines and the number of optical discs to be contained in the magazine.

In the recording and reproducing apparatus thus configured, in particular, since a large number of optical discs are contained within a single recording and reproducing apparatus, incapability of referring to correct contents information becomes a big disadvantage for the apparatus.

The object of the present disclosure is to provide a recording and reproducing apparatus capable of referring to correct contents information recorded on an optical disc.

Means for Solving Problem

A recording and reproducing apparatus of the present disclosure includes:
a plurality of magazines containing optical discs, each of the magazines having an individual identifying information storage unit which stores magazine identifying information and capacity information of the optical discs;
a recording and reproducing part which performs recording or reproduction of data to or from the optical disc;
an information acquiring part which acquires the magazine identifying information and the capacity information stored in the individual identifying information storage unit;
an information storage unit which stores contents information recorded on the optical discs and the magazine identifying information and the capacity information acquired by the information acquiring unit from the individual identifying information storage unit of the magazine containing the optical discs, correlated to one another;
an information comparing unit which compares the capacity information acquired by the information acquiring unit and the capacity information stored in the information storage unit correlated to the same magazine identifying information as the magazine identifying information acquired by the information acquiring unit;
a display unit which displays the contents information; and
a controller which controls the display unit, depending on results of the comparison effected by the information comparing unit, wherein
the controller causes the display unit to display the contents information stored in the information storage unit correlated to the same magazine identifying information as the magazine identifying information acquired by the information acquiring unit, when two pieces of the capacity information compared by the information comparing unit match, and wherein
the controller controls the recording and reproducing unit to read out the contents information from the optical discs of the magazine corresponding to the magazine identifying information acquired by the information acquiring unit and causes the display unit to display the read-out contents information, when the two pieces of the capacity information compared by the information comparing unit are different.

Effect of the Invention

The recording and reproducing apparatus of the present disclosure can refer to correct contents information recorded on an optical disc.

BRIEF DESCRIPTION OF DRAWINGS

These and other objects and features of the present disclosure will become obvious from the following description in conjunction with preferred embodiments with reference to the accompanying drawings, in which:

FIG. 4 is a diagram of an example of information stored in an information storage unit held by the recording and reproducing apparatus of FIG. 1;

FIG. 5 is a diagram of other example of the information stored in the information storage unit held by the recording and reproducing apparatus of FIG. 1;

FIG. 6 is a flowchart of a contents information reference operation in the recording and reproducing apparatus of FIG. 1;

EMBODIMENT FOR CARRYING OUT THE INVENTION

Figure 1:
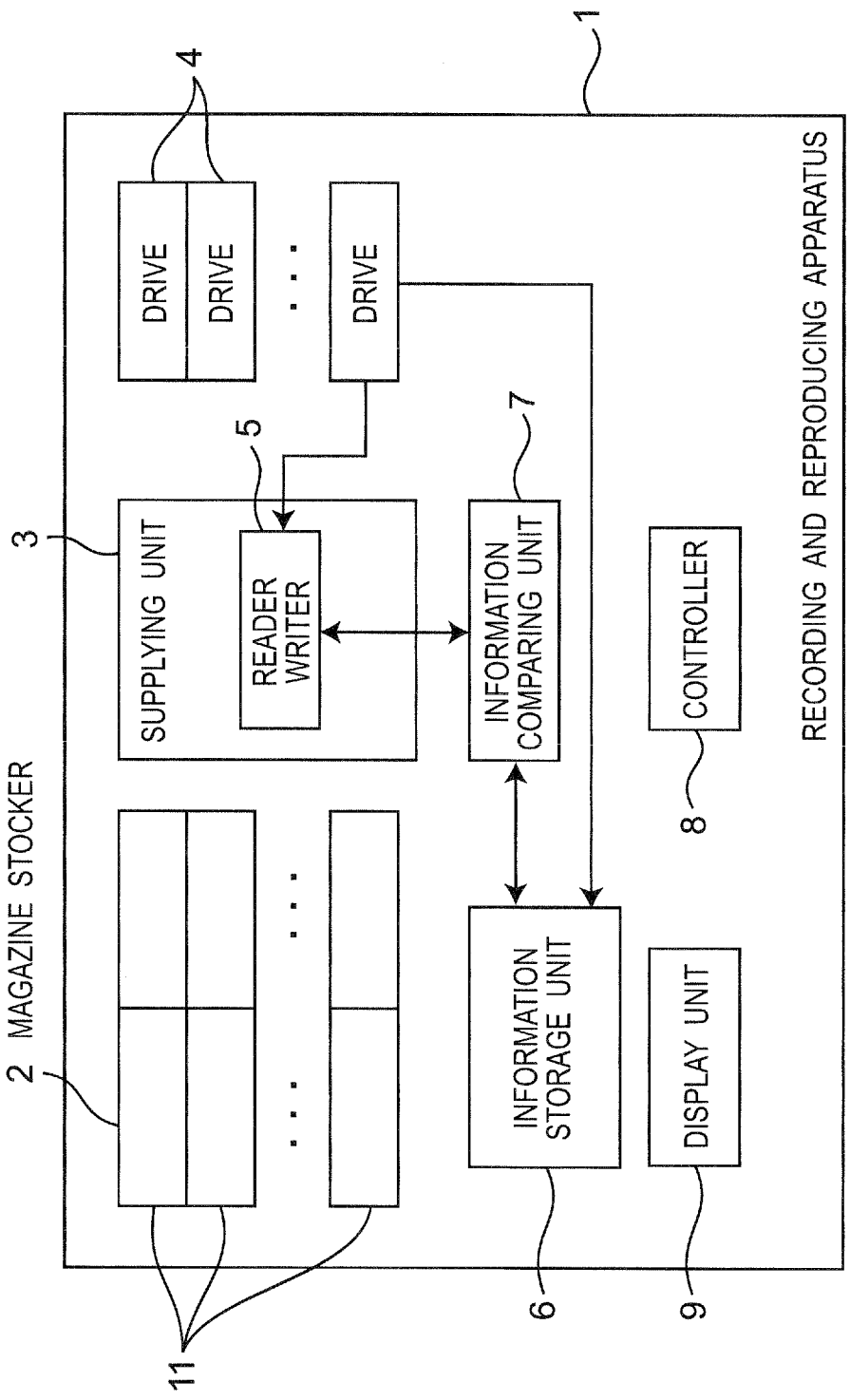
FIG. 1 is a schematic diagram of a configuration of a recording and reproducing apparatus according to a first embodiment of the present disclosure.

According to a first aspect of the present disclosure, there is provided a recording and reproducing apparatus including:

a plurality of magazines containing optical discs, each of the magazines having an individual identifying information storage unit which stores magazine identifying information and capacity information of the optical discs;

a recording and reproducing unit which performs recording or reproduction of data to or from the optical disc;

an information acquiring unit which acquires the magazine identifying information and the capacity information stored in the individual identifying information storage unit;

an information storage unit which stores contents information recorded on the optical discs, and the magazine identifying information and the capacity information acquired by the information acquiring unit from the individual identifying information storage unit of the magazine containing the optical discs, correlated to one another;

an information comparing unit which compares the capacity information acquired by the information acquiring unit, and the capacity information stored in the information storage unit correlated to the same magazine identifying information as the magazine identifying information acquired by the information acquiring unit;

a display unit which displays the contents information; and a controller which controls the display unit, depending on results of the comparison effected by the information comparing unit, wherein the controller causes the display unit to display the contents information stored in the information storage unit correlated to the same magazine identifying information as the magazine identifying information acquired by the information acquiring unit, when two pieces of the capacity information compared by the information comparing unit match, and the controller controls the recording and reproducing unit to read out the contents information from the optical discs of the magazine corresponding to the magazine identifying information acquired by the information acquiring unit and causes the display unit to display the read-out contents information, when the two pieces of the capacity information compared by the information comparing unit are different.

According to a second aspect of the present disclosure, there is provided the recording and reproducing apparatus of the first aspect, wherein the controller controls the recording and reproducing unit to read out the capacity information and the contents information from the optical discs of the magazine corresponding to the magazine identifying information acquired by the information acquiring unit and updates the capacity information and the contents information stored in the information storage unit to the capacity information and the contents information read out by the recording and the reproducing unit, when the two pieces of the capacity information compared by the information comparing unit are different.

According to a third aspect of the present disclosure, there is provided the recording and reproducing apparatus of the first or second aspect, wherein the same information as the information stored in the individual identifying information storage unit of the magazine containing the optical discs is recorded on the optical discs.

According to a fourth aspect of the present disclosure, there is provided the recording and reproducing apparatus of the third aspect, wherein the controller, when the information acquiring unit has failed to acquire the magazine identifying information and the capacity information, controls the recording and reproducing unit to read out the contents information from the optical discs of the magazine corresponding to the magazine identifying information that the information acquiring unit has failed to acquire and causes the display unit to display the read-out contents information.

According to a fifth aspect of the present disclosure, there is provided the recording and reproducing apparatus of the third aspect, wherein the controller, when the information acquiring unit has failed to acquire the magazine identifying information and the capacity information, controls the recording and reproducing unit to read out the magazine identifying information and the capacity information from the optical discs of the magazine corresponding to the magazine identifying information that the information acquiring unit has failed to acquire, the information comparing unit compares the capacity information read out by the recording and reproducing unit and the capacity information stored in the information storage unit correlated to the same magazine identifying information as the magazine identifying information read out by the recording and reproducing unit, the controller causes the display unit to display the contents information read out by the recording and reproducing unit, when the two pieces of the capacity information compared by the information comparing unit match, and the controller controls the recording and reproducing unit to read out the contents information from the optical discs of the magazine corresponding to the magazine identifying information that the information acquiring unit has failed to acquire and causes the display unit to display the read-out contents information, when the two pieces of the capacity information compared by the information comparing unit are different.

According to a sixth aspect of the present disclosure, there is provided the recording and reproducing apparatus of the third aspect, wherein the controller, when the information acquiring unit has failed to acquire the magazine identifying information and the capacity information, controls the recording and reproducing unit to read out the magazine identifying information, the capacity information, and the contents information from the optical discs of the magazine corresponding to the magazine identifying information that the information acquiring unit has failed to acquire, the information comparing unit compares the capacity information read out by the recording and reproducing unit and the capacity information stored in the information storage unit correlated to the same magazine identifying information as the magazine identifying information read out by the recording and reproducing unit, the controller causes the display unit to display the contents information read out by the recording and reproducing unit, when the two pieces of the capacity information compared by the information comparing unit match, and the controller causes the display unit to display the contents information read out by the recording and reproducing unit as well as updating the capacity information and the contents information stored in the information storage unit to the capacity information and the contents information read out by the recording and reproducing unit, when the two pieces of the capacity information compared by the information comparing unit are different.

According to a seventh aspect of the present disclosure, there is provided the recording and reproducing apparatus of any one of the third to sixth aspects, wherein the magazine contains a plurality of the optical discs, and the same information as the information stored in the individual identifying information storage unit of the magazine containing the plurality of the optical discs is recorded on each of the plurality of the optical discs.

According to an eighth aspect of the present disclosure, there is provided the recording and reproducing apparatus of the first aspect, wherein the individual identifying information storage unit further stores time information of the time at which the data was recorded by the recording and reproducing unit to the optical disc, the information acquiring unit acquires the magazine identifying information, the capacity information, and the time information from the individual identifying information storage unit, the information storage unit stores the contents information recorded on the optical discs and the magazine identifying information, the capacity information, and the time information acquired by the information acquiring unit from the individual identifying information storage unit of the magazine containing the optical discs, correlated to one another, the information comparing unit compares the capacity information and the time information acquired by the information acquiring unit and the capacity information and the time information stored in the information storage unit correlated to the same magazine identifying information as the magazine identifying information acquired by the information acquiring unit, the controller causes the display unit to display the contents information stored in the information storage unit correlated to the same magazine identifying information as the magazine identifying information acquired by the information acquiring unit, when the two pieces of the capacity information and the two pieces of the time information compared by the information comparing unit match, and the controller controls the recording and reproducing unit to read out the contents information from the optical discs of the magazine corresponding to the magazine identifying information acquired by the information acquiring unit and causes the display unit to display the read-out contents information, when the two pieces of the capacity information or the two pieces of the time information compared by the information comparing unit do not match.

Prior to continuing the descriptions of the present invention, the same reference letters or numerals are imparted to the same components in the accompanying drawings.

Recording and reproducing apparatuses according to embodiments of the present disclosure will now be described with reference to the drawings.

First Embodiment

Figures 2, 3:
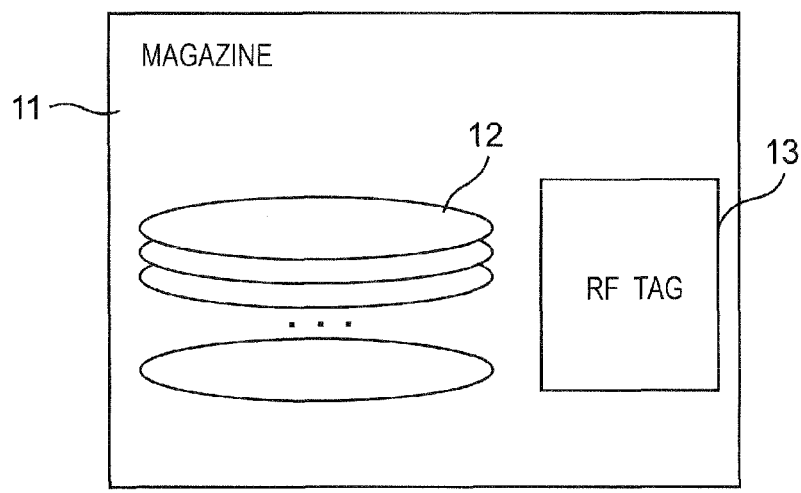
FIG. 2 is a schematic diagram of a configuration of a magazine held by the recording and reproducing apparatus of FIG. 1.
FIG. 3 is a diagram of an example of information stored in an RF tag of the magazine held by the recording and reproducing apparatus of FIG. 1.

A recording and reproducing apparatus according to a first embodiment of the present disclosure will be described. FIG. 1 is a schematic diagram of a configuration of the recording and reproducing apparatus according to this first embodiment. FIG. 2 is a schematic diagram of a configuration of the magazine held by the recording and reproducing apparatus of FIG. 1.

As shown in FIG. 1, a recording and reproducing apparatus 1 according to this first embodiment has a magazine stocker 2 which contains plural magazines 11.

Each magazine 11 is configured to be capable of containing plural sheets (e.g., 12 sheets) of optical discs 12 as shown in FIG. 2. In this first embodiment, the optical disc 12 is a recording media capable of recording data by a rewritable recording method (e.g., BD-RE). The magazine 11 can be called a recording medium having a recording capacity equal to the number of the optical discs 12 to be contained. As the number of the magazines 11 to be contained in the magazine stocker 2 is increased, the recording and reproducing apparatus 1 will have a higher recording capacity.

The plural optical discs 12 contained in the magazine 11 are supplied by a supplying unit 3 to plural (e.g., 12) drives 4 as an example of the recording and reproducing unit which performs recording or reproduction of the data to or from the optical disc 12. The supplying unit 3 takes out the plural optical discs 12 from the magazine 11 contained in the magazine stocker 2 and supplies the plural optical discs 12 to separate drives 4.

An RF tag 13 as an example of the individual identifying information storage unit is attached to each magazine 11. The RF tag 13 is an IC tag to and from which information can be written and read without contact. The RF tag 13 stores the magazine identifying information, empty capacity information as an example of the capacity information, and the time information, as shown in FIG. 3. The magazine identifying information refers to medium identifying information to identify the magazine 11. The empty capacity information refers to information on an additionally data-recordable capacity of the plural optical discs 12 inside the magazine 11. The time information refers to information on the time at which the data is recorded lastly to the plural optical discs 12 inside the magazine 11.

The supplying unit 3 is equipped with a reader writer 5 as an example of the information acquiring unit which acquires the magazine identifying information, the empty capacity information, and the time information stored in the RF tag 13 of each magazine 11. The reader writer 5 can also write various information to the RF tag 13. As shown in FIGS. 4 and 5, various information acquired by the reader writer 5 is stored in an information storage unit 6, correlated to contents information (e.g., information indicative of title of AV data) recorded in the plural optical discs 12 inside the magazine 11 to which the RF tag 13 is attached. In other words, the information storage unit 6 stores the contents information recorded in the plural pieces of the optical discs 12 inside the magazine 11 and the various information acquired by the reader writer 5 from the RF tag 13 of the magazine 11, correlated to each other. The information stored in the information storage unit 6 correlated to the magazine identifying information is hereinafter referred to as an entry.

The recording and reproducing apparatus 1 has an information comparing unit 7 which compares the empty capacity information and the time information acquired by the reader writer 5 and the empty capacity information and the time information stored in the information storage unit 6 correlated to the same magazine identifying information as the magazine identifying information acquired by the reader writer 5. Results of the comparison by the information comparing unit 7 are input to a controller 8. The controller 8 controls a display unit 9 which displays various information including the contents information, depending on results of the comparison effected by the information comparing unit 7.

The controller 8 is connected, for example, to a host computer which controls data. The host computer, based on an operator's instruction, orders the controller 8 to perform an operation such as writing or reading of data to or from the optical disc 12 inside a specified magazine 11. The controller 8, under the order, controls the operation of devices of the supplying unit 3, the drive 4, the display unit 9, etc.

Description will then be made of the operation at the time of referring to the contents information recorded in the optical disc 12 inside the magazine 11 (hereinafter, contents information reference operation) in the recording and reproducing apparatus 1 according the first embodiment of the present disclosure.

FIG. 6 is a flowchart of the contents information reference operation in the recording and reproducing apparatus according the first embodiment of the present disclosure. Description starts at the stage where the user has selected (specified), out of the plural magazines contained in the magazine stocker 2, the magazine 11 containing the optical disc 12 whose contents information he or she wants to refer to (hereinafter referred to as arbitrary magazine). Operation of each unit of the recording and reproducing apparatus 1 is performed under control of the controller 8.

At step ST1, the reader writer 5 acquires the magazine identifying information, the empty capacity information, and the time information from the RF tag 13 disposed in the arbitrary magazine 11.

At step ST2, the information comparing unit 7 searches for an entry having the same magazine identifying information as the magazine identifying information acquired by the reader writer 5 from the information storage unit 6.

At step ST3, it is judged if there is any entry having the same magazine identifying information as the magazine identifying information acquired by the reader writer 5. If there is not such an entry, then the flow goes to step ST4 and if there is such an entry, then the flow goes to step ST7. For example, when the magazine identifying information acquired by the reader writer 5 is XYZW (see FIG. 3), since there is an entry having the magazine identifying information of XYZW in the information storage unit 6 (see FIG. 4 or 5), the flow goes to step SIT At step ST4, the supplying unit 3 takes out plural the optical discs 12 and supplies the plural optical discs 12 to separate drives 4.

At step ST5, each drive 4 reads out the magazine identifying information, the empty capacity information, the time information, and the contents information from the supplied optical disc 12.

At step ST6, the information storage unit 6 stores the magazine identifying information, the empty capacity information, the time information, and the contents information read out by each drive 4 at step ST5, correlated to one another. Namely, the information storage unit 6 newly prepares and stores an entry corresponding to the arbitrary magazine 11. It is usually considered to be when no data are recorded in the optical disc 12 inside the magazine 11 which the information storage unit 6 newly stores an entry. In this case, the column of the contents information of the new entry is blank (see, e.g., the entry having the magazine identifying information of ABCD in FIG. 4 or 5). After completion of step ST6, the flow goes to step ST11.

At step ST7, the information comparing unit 7 compares the empty capacity information and the time information acquired by the reader writer 5 and the empty capacity information and the time information stored in the information storage unit 6 correlated to the same magazine identifying information as the magazine identifying information acquired by the reader writer 5. If two pieces of the empty capacity information or two pieces of the time information compared by the information comparing unit 7 do not match, then the flow goes to step ST8 and if two pieces of the empty capacity information and two pieces of the time information compared by the information comparing unit 7 match, then the flow goes to step ST11. For example, when the information acquired by the reader writer 5 is as shown in FIG. 3 and the information stored in the information storage unit 6 is as shown in FIG. 4, since two pieces of the empty capacity information and two pieces of the time information do not match, the flow goes to step ST8. On the other hand, when the information acquired by the reader writer 5 is as shown in FIG. 3 and the information stored in the information storage unit 6 is as shown in FIG. 5, since two pieces of the empty capacity information and two pieces of the time information match, the flow goes to step ST11.

At step ST8, the supplying unit 3 takes out the plural optical discs 12 from the arbitrary magazine 11 and supplies the plural optical discs 12 to separate drives 4.

At step ST9, each drive 4 reads out the magazine identifying information, the empty capacity information, the time information, and the contents information from the supplied optical disc 12.

At step ST10, the information storage unit 6 stores the magazine identifying information, the empty capacity information, the time information, and the contents information read out by each drive 4 at step ST9, correlated to one another. Namely, the information storage unit 6 updates the stored entry corresponding to the arbitrary magazine 11. After completion of step ST10, the flow goes to step ST11.

At step ST11, the display unit 9 displays the contents information. Namely, when, at step ST3, there is no entry having the same magazine identifying information as the magazine identifying information acquired by the reader writer 5, the display unit 9 displays the contents information read out by each drive 4 at step ST5. When two pieces of the capacity information and two pieces of the time information compared by the information comparing unit 7 at step ST7 match, the display unit 9 displays the contents information of the entry having the same magazine identifying information as the magazine identifying information acquired by the reader writer 5 at step ST2. When two pieces of the capacity information and two pieces of the time information compared by the information comparing unit 7 at step ST7 do not match, the display unit 9 displays the contents information read out by each drive 4 at step ST9. This enables the user to refer to the contents information recorded on the optical discs 12 inside the arbitrary magazine 11.

The recording and reproducing apparatus 1 according to the first embodiment has the information comparing unit 7 which compares the capacity information and the time information acquired by the reader writer 5 and the capacity information and the time information stored in the information storing unit 6 correlated to the same magazine identifying information as the magazine identifying information acquired by the reader writer 5. For example, when the contents information recorded on the optical disc 12 inside the arbitrary magazine 11 has been updated by other recording and reproducing apparatus, two pieces of the capacity information and two pieces of the time information compared by the information comparing unit 7 do not match. For this reason, in the recording and reproducing apparatus 1 according to the first embodiment, when two pieces of the capacity information and two pieces of the time information compared by the information comparing unit 7 do not match, the drives 4 are controlled to read out the contents information from the optical discs 12 of the magazine 11 corresponding to the magazine identifying information acquired by the reader writer 5 and the display unit 9 is caused to display the read-out contents information. This makes it possible to refer to correct contents information recorded on the optical disc 12 even when the contents information recorded on the optical disc 12 inside the arbitrary magazine 11 has been updated by other recording and reproducing apparatus.

When the contents information recorded on the optical disc 12 inside the arbitrary magazine 11 has not been updated by other recording and reproducing apparatus, two pieces of the capacity information and two pieces of the time information compared by the information comparing unit 7 match. For this reason, in the recording and reproducing apparatus according to this first embodiment, when two pieces of the capacity information and two pieces of the time information compared by the information comparing unit 7 match, the display unit 9 is caused to display the contents information stored in the information storage unit 6 correlated to the same magazine identifying information as the magazine identifying information acquired by the reader writer 7. This makes it possible to speedily refer to the correct contents information recorded on the optical disc 12.

The magazine identifying information, the empty capacity information, and the time information read out by each drive 4 at step ST5 or ST9 are written by the reader writer 5 to the RF tag of the arbitrary magazine 11. Namely, the reader writer updates various information of the RF tag 13 of the arbitrary magazine 11. By this, the RF tag 13 of the arbitrary magazine 11 stores correct information. The timing of updating the various information of the RF tag 13 of the arbitrary magazine 11 by the reader writer 5 may be the same as, or may be different from, the timing of updating (or newly preparing) the entry stored in the information storage unit 6.

Second Embodiment

Figure 7:
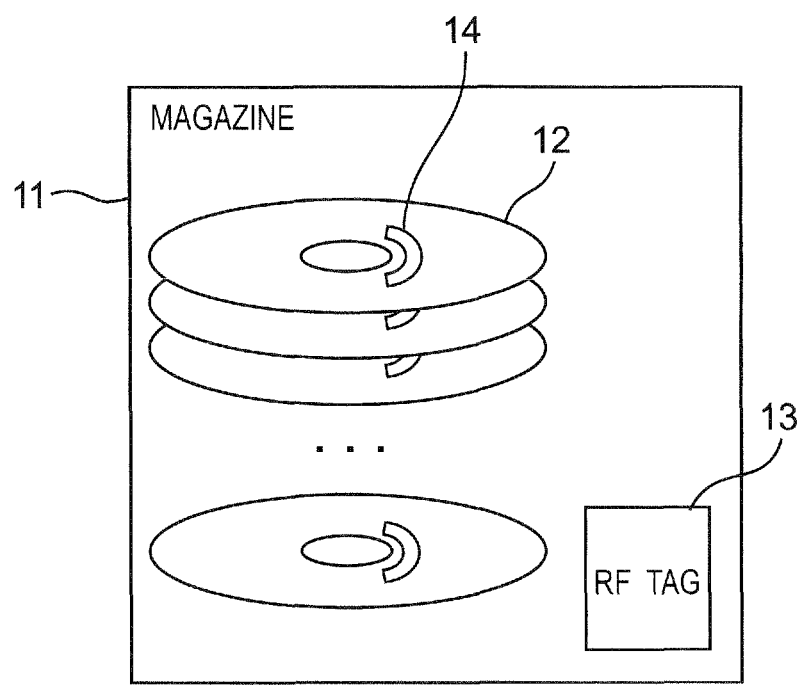
FIG. 7 is a schematic diagram of a configuration of the magazine of the recording and reproducing apparatus according to a second embodiment of the disclosure.

A recording and reproducing apparatus according to a second embodiment of the present disclosure will be described. FIG. 7 is a schematic diagram of a configuration of the magazine of the recording and reproducing apparatus according to the second embodiment. The recording and reproducing apparatus according to this second embodiment differs from the recording and reproducing apparatus according to the first embodiment in which the same information as the information stored in the RF tag 13 of the magazine 11 containing plural sheets of the optical discs 12 is recorded in each of the plural optical discs 12. Region 14 of FIG. 7 is a region in which the same information is recorded as the information stored in the RF tag 13.

The data guarantee period of the optical disc 12 is usually 50 years. On the other hand, the data guarantee period of the RF tag 13 is usually 10 years. Namely, the data stored in the RF tag 13 disappears (or changes into different values) earlier than the data stored on the optical disc 12 does. For this reason, it is possible that the reader writer 5 fails to acquire the various information of the RF tag 13, when the optical disc 12 is still recordable or reproducible. In such a case, a CRC error occurs. In the conventional recording and reproducing apparatus, when the CRC error occurs, normally, the operation of the entire apparatus is stopped. In this case, the contents information of the optical disc 12 cannot be referred to.

Figure 8:
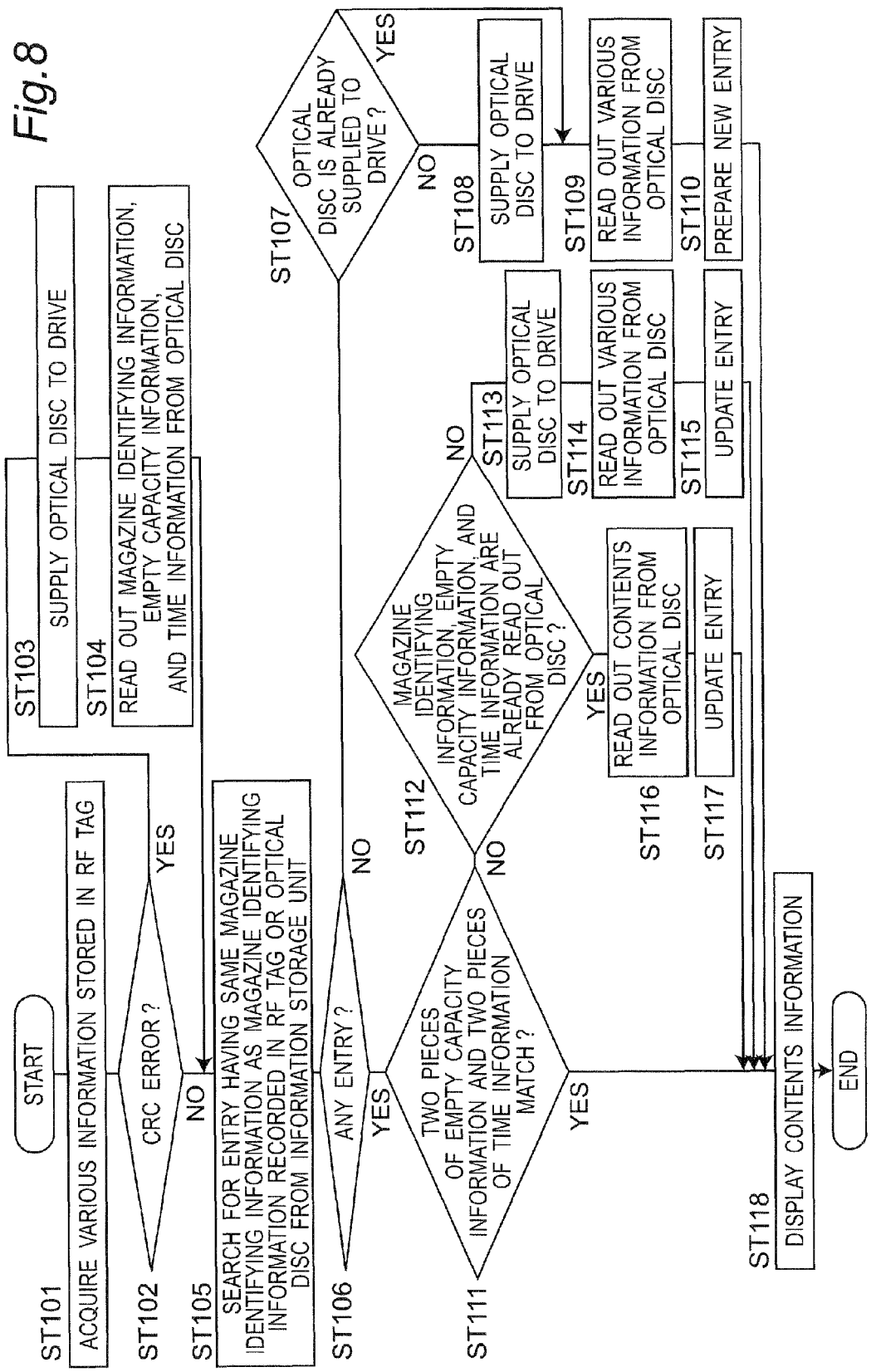
FIG. 8 is a flowchart of the contents information reference operation in the recording and reproducing apparatus of FIG. 7.

By contrast, in the recording and reproducing apparatus according to this second embodiment, even when the CRC error occurs, the following contents information reference operation is performed. FIG. 8 is a flowchart of the contents information reference operation in the recording and reproducing apparatus according to the second embodiment.

At step ST101, the reader writer 5 acquires the magazine identifying information, the empty capacity information, and the time information from the RF tag 13 disposed in the arbitrary magazine 11.

At step ST102, at the time of acquisition by the reader writer 5 of various information from the RF tag 13, it is judged if the CRC error has occurred. If the CRC error has occurred, then the flow goes to step ST103 and if the CRC error has not occurred, then the flow goes to step ST105.

At step ST103, the supplying unit 3 takes out plural sheets of the optical discs 12 from the arbitrary magazine 11 and supplies the plural optical discs 12 to separate drives 4.

At step ST104, each drive 4 reads out the magazine identifying information, the empty capacity information, and the time information (same information as the information to be stored in the RF tag 13) from the supplied optical disc 12.

At step ST105, the information comparing unit 7 searches for the entry having the same magazine identifying information as the magazine identifying information read out by each drive 4 or the reader writer 5, from the information storage unit 6.

At step ST106, it is judged if there is any entry having the same magazine identifying information as the magazine identifying information acquired by each drive 4 or the reader writer 5. If there is not such an entry, then the flow goes to step ST107 and if there is such an entry, then the flow goes to step ST111. For example, when the magazine identifying information read out by each drive 4 is XYZW (see FIG. 3), since there is the entry having the magazine identifying information of XYZW in the information storage unit 6 (see FIG. 4 or 5), the flow goes to step ST111.

At step ST107, it is judged if the optical disc 12 is supplied to each drive 4. Namely, it is judged if the action of step ST103 was performed. If the optical disc 12 is not supplied to each drive 4, then the flow goes to step ST108 and if the optical disc 12 is already supplied to each drive 4, then the flow goes to step ST109.

At step ST108, the supplying unit 3 takes out plural sheets of the optical discs 12 from the arbitrary magazine 11 and supplies the plural optical discs 12 to separate drives 4.

At step ST109, each drive 4 reads out the magazine identifying information, the empty capacity information, the time information, and the contents information from the supplied optical disc 12. When the action of step ST103 was performed and the magazine identifying information, the empty capacity information, and the time information were already read out from the optical disc 12 supplied to each drive 4 at step ST104 (in the case of YES of step ST107), the reading-out of these pieces of information may be omitted.

At step ST110, the information storage unit 6 stores the magazine identifying information, the empty capacity information, the time information, and the contents information read out by each drive 4 at step ST109, correlated to one another. Namely, the information storage unit 6 newly prepares and stores an entry corresponding to the arbitrary magazine 11. After completion of step ST110, the flow goes to step ST118.

At step ST111, the information comparing unit 7 compares the empty capacity information and the time information acquired by the reader writer 5 or each drive 4 and the empty capacity information and the time information stored in the information storage unit 6 correlated to the same magazine identifying information as the magazine identifying information acquired by the reader writer 5 or each drive 4. If two pieces of the empty capacity information and two pieces of the time information compared by the information comparing unit 7 do not match, then the flow goes to step ST112 and if two pieces of the empty capacity information and two pieces of the time information compared by the information comparing unit 7 match, then the flow goes to step ST118.

At step ST112, it is judged if the magazine identifying information, the empty capacity information, and the time information (the same information as the information stored in RF tag 13) were already read out from the optical discs 12 inside the arbitrary magazine 11. Namely, it is judged if the action of step ST104 was performed. If the various information is not yet read out, then the flow goes to step ST113 and if the various information is already read out, then the flow goes to step ST116.

At step ST113, the supplying unit 3 takes out plural sheets of the optical discs 12 from the arbitrary magazine 11 and supplies the plural optical discs 12 to separate drives 4.

At step ST114, each drive 4 reads out the magazine identifying information, the empty capacity information, the time information, and the contents information from the supplied optical disc 12.

At step ST115, the information storage unit 6 stores the magazine identifying information, the empty capacity information, the time information, and the contents information read out by each drive 4 at step ST114, correlated to one another. Namely, the information storage unit 6 updates the stored entry corresponding to the arbitrary magazine 11. After completion of step ST115, the flow goes to step ST118.

At step ST116, each drive 4 reads out the contents information (remaining information) from the optical disc 12 supplied at step ST103.

At step ST117, the information storage unit 6 stores the magazine identifying information, the empty capacity information, and the time information read out by each drive 4 at step ST104, and the contents information read out by each drive 4 at step ST116, correlated to each other. Namely, the information storage unit 6 updates the stored entry corresponding to the arbitrary magazine 11. After completion of step ST117, the flow goes to step ST118.

At step ST118, the display unit 9 displays the contents information of the entry having the same magazine identifying information as the magazine identifying information acquired by the reader writer 5 at step ST101 or the contents information read out by each drive 4 at step ST109, step ST114, or step ST116. This enables the user to refer to the contents information stored in the optical discs 12 inside the arbitrary magazine 11.

The magazine identifying information, the empty capacity information, and the time information read out by each drive 4 at step ST104, step ST109, or step ST114 are written by the reader writer 5 to the RF tag 13 and each optical disc 12 of the arbitrary magazine 11. Namely, the reader writer 5 updates the various information of the RF tag 13 and each optical disc 12 of the arbitrary magazine 11. By this, the RF tag 13 and each optical disc 12 of the arbitrary magazine 11 store correct information. The timing of updating by the reader writer 5 of the various information of the RF tag 13 and each optical disc 12 of the arbitrary magazine 11 may be the same as, or may be different from, the timing of updating (or newly preparing) of the entry stored in the information storage unit 6.

According to the recording and reproducing apparatus of this second embodiment, since the same information as the information stored in the RF tag 13 of the magazine 11 containing the optical discs 12 is recorded on such optical discs 12, the contents information reference operation can be continued and correct contents information can be referred to even when the CRC error occurs. Even when, for example, the RF tag 13 fails and even the CRC error does not occur (in the case of being unable to communicate with the RF tag 13), the correct contents information can be referred to by recording the same information as the information stored in the RF tag 13 on the optical disc 12 and reading out such information.

The effect mentioned above can be obtained even if the number of the optical discs 12 to which the same information as the information stored in the RF tag 13 is written is one. In this case, however, if there is any abnormality with the optical disc 12 on which the information is recorded or with the drive 4 which performs the recording or the reproduction to or from the optical disc 12, it is possible that the same information as the information stored in the RF tag 13 cannot be referred to. For this reason, it is preferable to record the same information as the information stored in the RF tag 13 on two or more sheets of the optical discs 12 inside the magazine 11. This makes it possible to refer to the same information as the information stored in the RF tag 13 more surely.

For example, it is possible that the user erroneously exchanges the optical disc 12 inside the magazine 11 for an irregular optical disc (optical disc inside other magazine or optical disc unusable in this recording and reproducing apparatus). For this reason, it is preferable to record the same information as the information stored in the RF tag 13 on each of the plural optical discs 12 inside the magazine 11, as done in the recording and reproducing apparatus according to this second embodiment. This makes it possible to detect mixing of the irregular optical disc by referring to the magazine identifying information recorded on each optical disc 12.

The above has described the embodiments as examples of the technology in the present disclosure. Accompanying drawings and detailed description have been provided for such a purpose. Therefore, constituent elements written in the accompanying drawings and the detailed description not only include the constituent elements essential for the solution of the problem but also can include the constituent elements non-essential for the solution of the problem for the purpose of exemplifying the technology. For this reason, the mere fact that these non-essential constituent elements are written in the accompanying drawings or the detailed description should not automatically be the ground for recognizing these non-essential constituent elements as essential.

Since the above embodiments are intended for exemplifying the technology in the present disclosure, various changes, replacements, additions, omissions, etc., can be made without departing from the scope of claims or the scope equivalent thereto.

For example, in the above embodiments, the example was described of using the empty capacity information as the capacity information but the present invention is not limited thereto. For example, the information on a recorded capacity of the data recorded on the optical disc 12 may be used in place of the empty capacity information.

In the above embodiments, the example was described of using the RF tag 13 as the individual identifying information storage unit but the present invention is not limited thereto. The individual identifying information storage unit may be a storage unit in which individual identifying information is recorded, irrespective of whether a contact type or a noncontact type.

Figure 9:
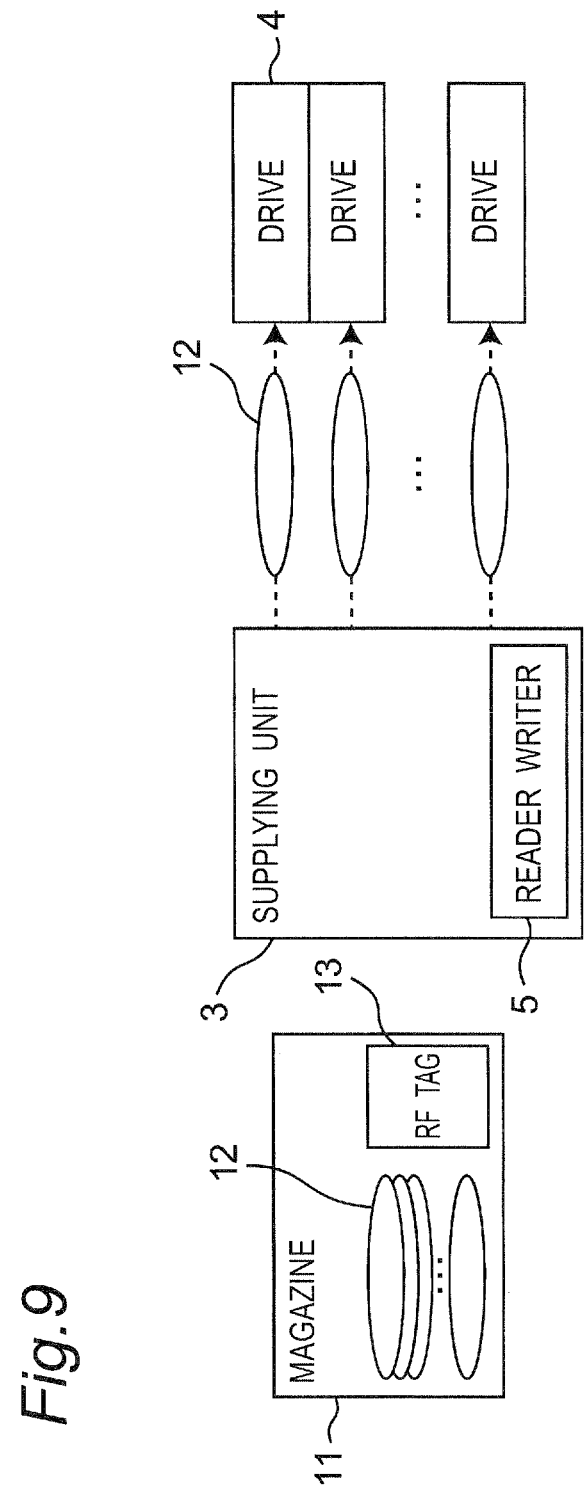
FIG. 9 is a schematic diagram of how a supplying unit supplies plural sheets of optical discs inside the magazine to separate drives.
Figure 10:
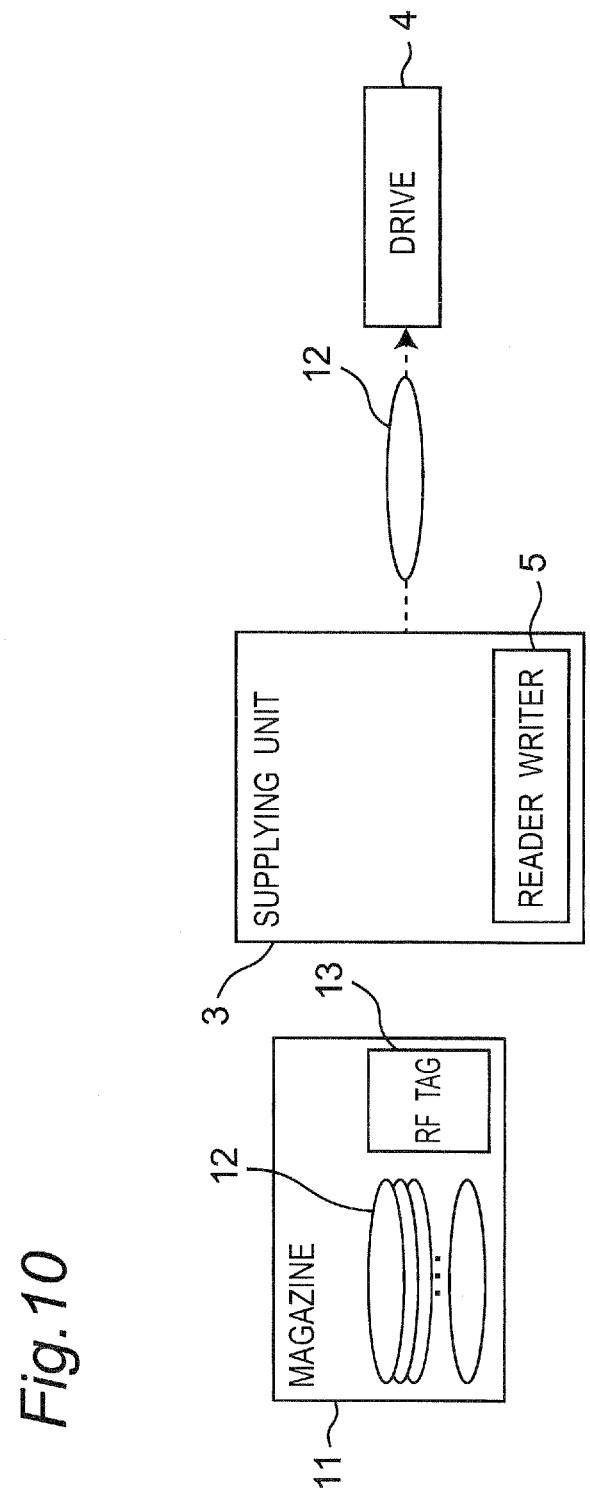
FIG. 10 is a schematic diagram of how the supplying unit supplies the plural optical discs, sheet by sheet, to the drive.

In the above embodiments, as shown in FIG. 9, the apparatus is configured so that the same number of drives 4 are disposed as the number of the optical discs 12 inside the magazine 11 and the plural optical discs 12 are supplied to separate drives 4, but the present invention is not limited thereto. For example, as shown in FIG. 10, the apparatus may be configured so that a single drive 4 is disposed and the optical discs 12 are supplied, sheet by sheet, to this drive 4.

In the above embodiments, plural sheets of the optical discs 12 are contained in one magazine 11 but the present invention is not limited thereto. One sheet of the optical disc 12 may be contained in one magazine 11.

In the above embodiments, the time information as well is stored in the RF tag 13 and the information storage unit 6 but the present invention is not limited thereto. The time information is not necessarily required to be stored in the RF tag 13 or the information storage unit 6. However, in the case of using a recording medium capable of recording data by a rewritable type recording system as the optical disc 12, even if the empty capacity information is the same, data contents can be different. In this case, it is possible that correct contents information cannot be displayed. By contrast, in the case of using a recording medium capable of recording data by a write-once type recording system (e.g., BD-R medium) as the optical disc 12, since, if the empty capacity information is the same, data contents are necessarily the same, the need to store the time information can be eliminated.

In the above embodiments, only the contents information is displayed on the display unit 9 but the present invention is not limited thereto. Other information as well, such as the empty capacity information and the time information, may be displayed on the display unit 9. In this case, the user, for example, referring to both of the contents information and the empty capacity information, can perform reproduction of data or recording of new data from or to the optical disc 12.

Figure 11:
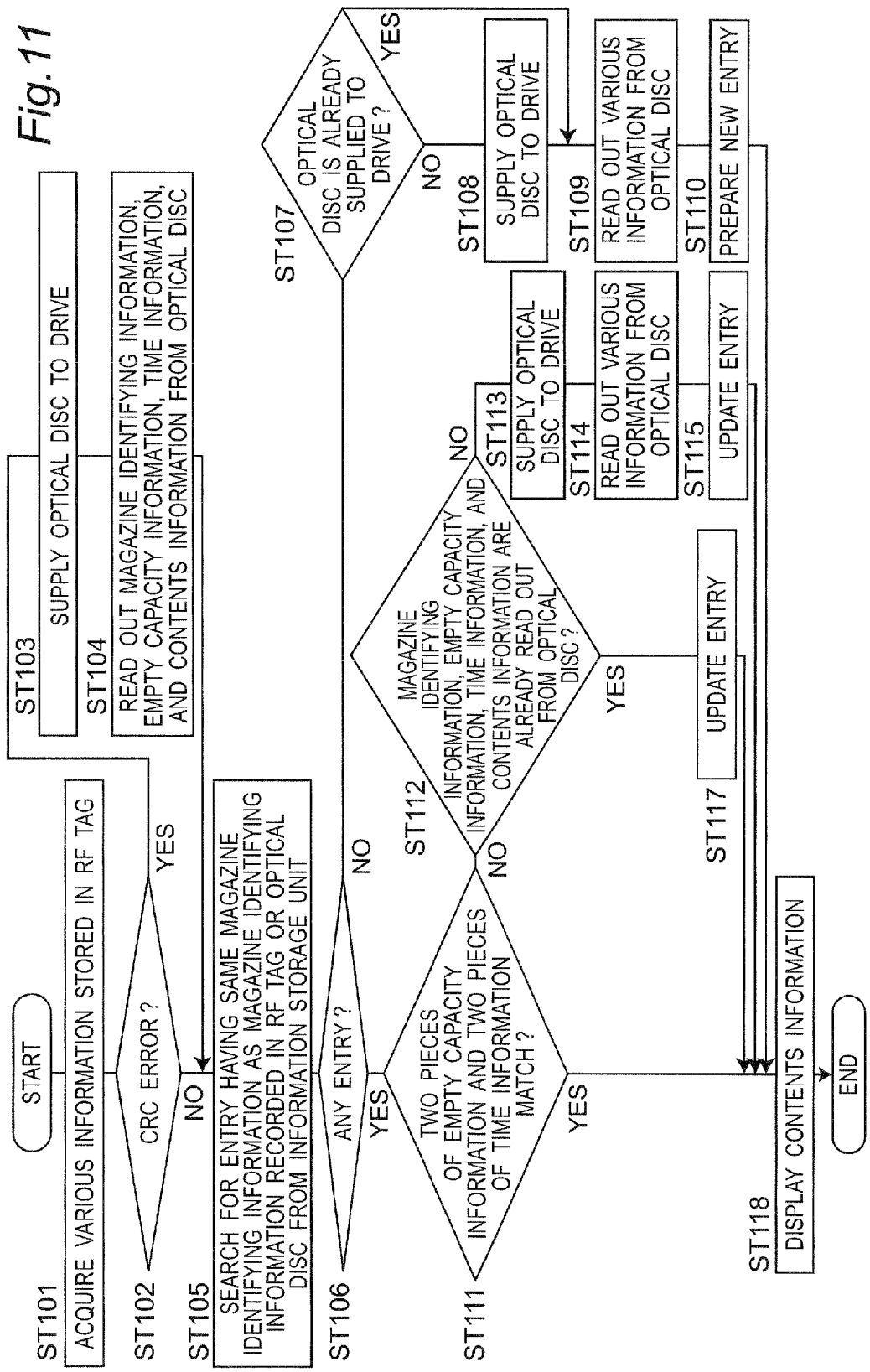
FIG. 11 is a flowchart of a variation example of the contents information reference operation in the recording and reproducing apparatus of FIG. 7.

In the second embodiment, at step ST104 (see FIG. 8), each drive 4 reads out the magazine identifying information, the empty capacity information, and the time information from the supplied optical disc 12 but the present invention is not limited thereto. For example, as shown in FIG. 11, it may be so arranged that at step ST104, each drive 4 will read out the contents information in addition to the magazine identifying information, the empty capacity information, and the time information from the supplied optical disc 12 and that at step ST112, it will be judged if these pieces of information is already read out. The need to perform the action of step ST116 (see FIG. 8) can be eliminated by reading out the contents information as well at step ST104. In this case as well, as described above, the time information is not necessarily required to be stored in the RF tag 13 or the information storage unit 6.

Figure 12:
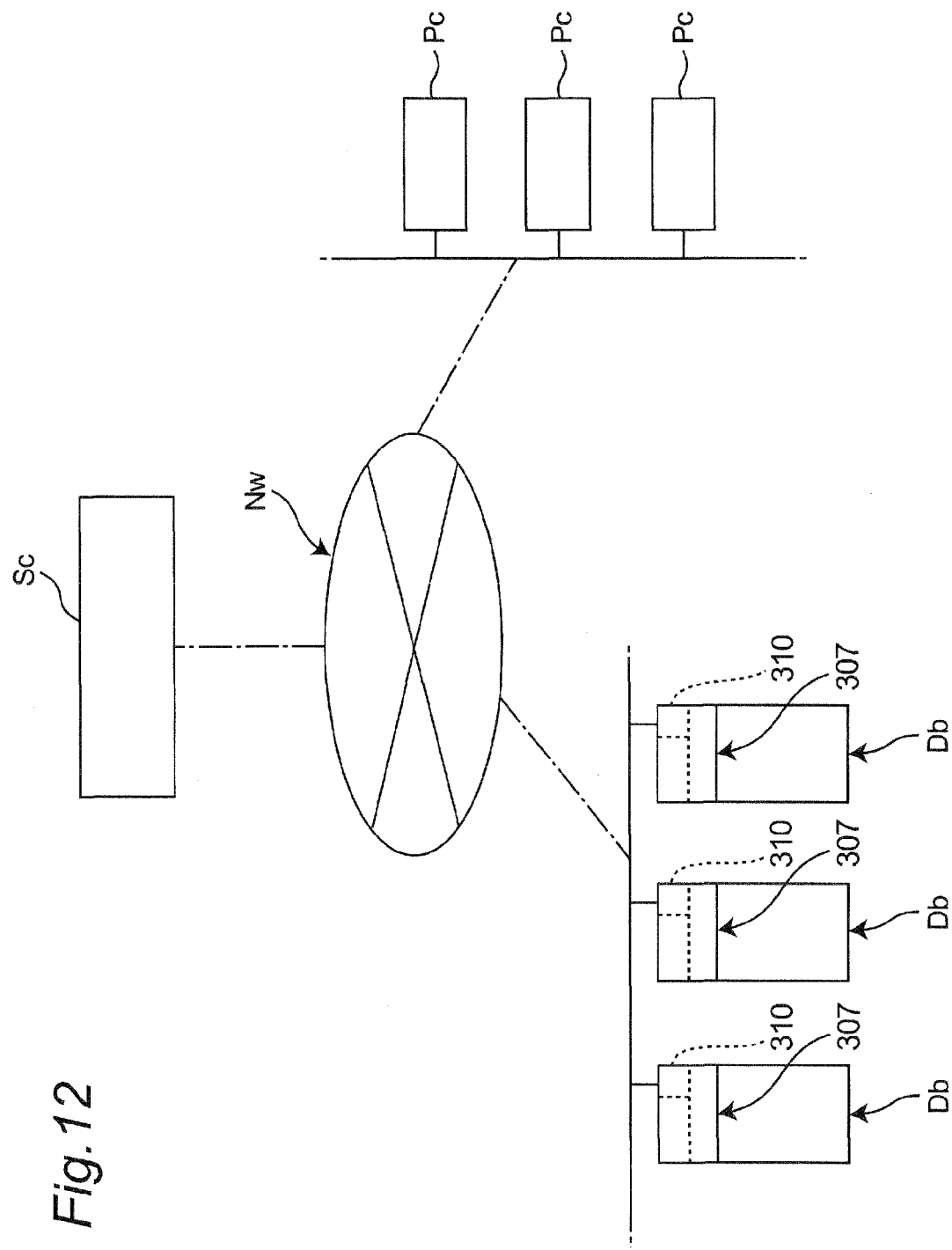
FIG. 12 is a configuration diagram of an example of a system configuration in the case of performing a control of the recording and reproducing apparatus, using a cloud computing system.

While, in the above embodiments, the controller 8, under order from the host computer, controls the operation of the devices of the supplying unit 3, the drive 4, the display unit 9, etc., such a control can be performed by using a so-called cloud computing system. FIG. 12 is a schematic configuration diagram of an example of a system configuration in the case of performing the control of the recording and reproducing apparatus, using the cloud computing system.

As shown in FIG. 12, the cloud computing system has a server Sc (so-called cloud server) accessible by way of a network Nw. In this case, a recording and reproducing apparatus Db has, for example, a network communicating unit 310 within a control unit 307 disposed in the controller 8. The recording and reproducing apparatus Db is communicably connected, by this network communicating unit 310, to the cloud server Sc by way of the network Nw. Such a network communicating unit 310 may be disposed within the control unit 307 of the recording and reproducing apparatus Db or may be disposed separately from the control unit 307.

A user terminal Pc that operates the recording and reproducing apparatus Db is also communicably connected to the cloud server Sc by way of the network Nw. For example, a so-called personal computer configured to have a microcomputer as a main unit and have a communicating function can be used as such a user terminal Pc.

The cloud server Sc holds, for example, a program to execute required control and operation to be performed using the user terminal Pc and further, at least a unit of the data necessary for such control and operation and in response to the user's demand, can make available for downloading and use the required program and data each time.

As shown in FIG. 12, plural user terminals Pc may be connected to the network Nw. Plural recording and reproducing apparatuses Db can be connected to the network Nw and be separately controlled.

The recording and reproducing apparatus Db has the same configuration as, and performs the same operation as, that of the recording and reproducing apparatus according to the above embodiments except that the recording and reproducing apparatus Db has the network communicating unit 310 and is controlled by use of the cloud server Sc.

With the use of such a cloud computing system, as compared with the conventional case of having the program and the data held by the recording and reproducing apparatus, the user terminal, or storage devices attached thereto, the configuration of these devices and apparatus can be simplified. This is effective especially when the program and the data to be used are forced to become too large.

The cloud server Sc may be used for the purpose of a data backup of the recording and reproducing apparatus Db in place of, or in addition to, the purpose of control and operation of the recording and reproducing apparatus Db described above.

The disclosure contents of the specification, the drawings, and the scope of claims of Japanese Patent Application No. 2012-219123 filed on Oct. 1, 2013 shall be referred to as a whole and shall be incorporated in this specification.

INDUSTRIAL APPLICABILITY

The recording and reproducing apparatus according to the present disclosure can refer to the correct contents information recorded on the optical disc and therefore, is useful especially as the recording and reproducing apparatus of a large-volume data archiver, etc.

EXPLANATIONS OF REFERENCE NUMERALS 1 recording and reproducing apparatus
2 magazine stocker
3 supplying unit
4 drive
5 reader writer (information acquiring unit)
6 information storage unit
7 information comparing unit
8 controller
9 display unit
11 magazine
12 optical disc
13 RF tag (individual identifying information storage unit)
14 region

The invention claimed is:

1. A recording and reproducing apparatus comprising:
a plurality of magazines containing optical discs, each of the magazines having an individual identifying information storage unit which stores magazine identifying information and capacity information of the optical discs;
a recording and reproducing unit which performs recording or reproduction of data to or from any of the optical discs;
an information acquiring unit which acquires the magazine identifying information and the capacity information stored in the individual identifying information storage unit;
an information storage unit which stores contents information recorded on the optical discs, and the magazine identifying information and the capacity information acquired by the information acquiring unit from the individual identifying information storage unit of the magazine containing the optical discs, correlated to one another;
an information comparing unit which compares the capacity information acquired by the information acquiring unit, and the capacity information stored in the information storage unit correlated to the same magazine identifying information as the magazine identifying information acquired by the information acquiring unit;
a display unit which displays the contents information; and
a controller which controls the display unit, depending on results of the comparison effected by the information comparing unit, wherein
the controller causes the display unit to display the contents information stored in the information storage unit correlated to the same magazine identifying information as the magazine identifying information acquired by the information acquiring unit, when two pieces of the capacity information compared by the information comparing unit match, and
the controller controls the recording and reproducing unit to read out the contents information from the optical discs of the magazine corresponding to the magazine identifying information acquired by the information acquiring unit and causes the display unit to display the read-out contents information, when the two pieces of the capacity information compared by the information comparing unit are different.

2. The recording and reproducing apparatus according to claim 1, wherein the controller controls the recording and reproducing unit to read out the capacity information and the contents information from the optical discs of the magazine corresponding to the magazine identifying information acquired by the information acquiring unit and updates the capacity information and the contents information stored in the information storage unit to the capacity information and the contents information read out by the recording and the reproducing unit, when the two pieces of the capacity information compared by the information comparing unit are different.

3. The recording and reproducing apparatus according to claim 1, wherein the same information as the information stored in the individual identifying information storage unit of the magazine containing the optical discs is recorded on the optical discs.

4. The recording and reproducing apparatus according to claim 3, wherein the controller, when the information acquiring unit has failed to acquire the magazine identifying information and the capacity information, controls the recording and reproducing unit to read out the contents information from the optical discs of the magazine corresponding to the magazine identifying information that the information acquiring unit has failed to acquire and causes the display unit to display the read-out contents information.

5. The recording and reproducing apparatus according to claim 3, wherein the controller, when the information acquiring unit has failed to acquire the magazine identifying information and the capacity information, controls the recording and reproducing unit to read out the magazine identifying information and the capacity information from the optical discs of the magazine corresponding to the magazine identifying information that the information acquiring unit has failed to acquire,
the information comparing unit compares the capacity information read out by the recording and reproducing unit and the capacity information stored in the information storage unit correlated to the same magazine identifying information as the magazine identifying information read out by the recording and reproducing unit,
the controller causes the display unit to display the contents information read out by the recording and reproducing unit, when the two pieces of the capacity information compared by the information comparing unit match, and
the controller controls the recording and reproducing unit to read out the contents information from the optical discs of the magazine corresponding to the magazine identifying information that the information acquiring unit has failed to acquire and causes the display unit to display the read-out contents information, when the two pieces of the capacity information compared by the information comparing unit are different.

6. The recording and reproducing apparatus according to claim 3, wherein the controller, when the information acquiring unit has failed to acquire the magazine identifying information and the capacity information, controls the recording and reproducing unit to read out the magazine identifying information, the capacity information, and the contents information from the optical discs of the magazine corresponding to the magazine identifying information that the information acquiring unit has failed to acquire, the information comparing unit compares the capacity information read out by the recording and reproducing unit and the capacity information stored in the information storage unit correlated to the same magazine identifying information as the magazine identifying information read out by the recording and reproducing unit, the controller causes the display unit to display the contents information read out by the recording and reproducing unit, when the two pieces of the capacity information compared by the information comparing unit match, and the controller causes the display unit to display the contents information read out by the recording and reproducing unit as well as updating the capacity information and the contents information stored in the information storage unit to the capacity information and the contents information read out by the recording and reproducing unit, when the two pieces of the capacity information compared by the information comparing unit are different.

7. The recording and reproducing apparatus according to claim 3, wherein the magazine contains a plurality of the optical discs, and the same information as the information stored in the individual identifying information storage unit of the magazine containing the plurality of the optical discs is recorded on each of the plurality of the optical discs.

8. The recording and reproducing apparatus according to claim 1, wherein the individual identifying information storage unit further stores time information of a time at which the data was recorded by the recording and reproducing unit to the optical disc, the information acquiring unit acquires the magazine identifying information, the capacity information, and the time information from the individual identifying information storage unit, the information storage unit stores the contents information recorded on the optical discs and the magazine identifying information, the capacity information, and the time information acquired by the information acquiring unit from the individual identifying information storage unit of the magazine containing the optical discs, correlated to one another, the information comparing unit compares the capacity information and the time information acquired by the information acquiring unit and the capacity information and the time information stored in the information storage unit correlated to the same magazine identifying information as the magazine identifying information acquired by the information acquiring unit, the controller causes the display unit to display the contents information stored in the information storage unit correlated to the same magazine identifying information as the magazine identifying information acquired by the information acquiring unit, when the two pieces of the capacity information and the two pieces of the time information compared by the information comparing unit match, and the controller controls the recording and reproducing unit to read out the contents information from the optical discs of the magazine corresponding to the magazine identifying information acquired by the information acquiring unit and causes the display unit to display the read-out contents information, when the two pieces of the capacity information or the two pieces of the time information compared by the information comparing unit do not match.

* * * * *